3,085,857
MANUFACTURE OF AMMONIUM SULPHATE
Diarmid John Montgomery O'Sullivan, Yeoville, Johannesburg, Transvaal, Republic of South Africa, and Barrie Bernett Pearce, Norton-on-Tees, England, assignors to Imperial Chemical Industries Limited, London, England, a corporation of Great Britain
No Drawing. Filed Aug. 12, 1960, Ser. No. 49,159
Claims priority, application Great Britain Aug. 19, 1959
10 Claims. (Cl. 23—119)

This invention relates to the manufacture of ammonium sulphate and in particular to an improvement in the process for the manufacture of ammonium sulphate from ammonia and calcium sulphate.

The manufacture of ammonium sulphate from ammonia and calcium sulphate is a well-known process. The essential reaction is:

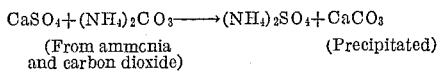

$$CaSO_4 + (NH_4)_2CO_3 \longrightarrow (NH_4)_2SO_4 + CaCO_3$$

(From ammonia and carbon dioxide)      (Precipitated)

It is usual to proceed by the following stages which may take place separately or in combination:

(1) Dissolving the ammonia in water.
(2) Formation of ammonium carbonate by the action of carbon dioxide.
(3) Reaction of ammonium carbonate with calcium sulphate.
(4) Separation of calcium carbonate by settling or filtration or both, possibly in more than one stage.
(5) Evaporation of the filtrate and crystallisation of ammonium sulphate.

With the calcium carbonate removed in stage 4, there is present a proportion of other insoluble matter such as residual unreacted calcium sulphate and impurities from the calcium sulphate, such as iron and magnesium compounds. It is found in practice that it is difficult to remove the insoluble substances completely since they are present in part in so fine a state of subdivision that a proportion passes through normal filters and does not settle out on standing for a practicable length of time. When calcium carbonate is present in ammonium sulphate during the evaporation stage, the reaction shown above takes place in reverse and the resulting calcium sulphate contaminates the evaporators.

It has now been found that the separation of calcium carbonate and other insoluble matter is facilitated by the action of certain anionic surface active agents.

According to the present invention there is provided a process for the manufacture of ammonium sulphate by reacting together ammonia, carbon dioxide and calcium sulphate which comprises providing for the presence in the reaction mixture at a stage when insoluble by-products are present of an agent comprising a salt of at least one carboxylic or sulphonic acid containing an aliphatic chain of at least 8 carbon atoms. The aliphatic hydrocarbon chain may be straight or branched. Suitably it contains at least 11 carbon atoms.

The most useful improvement in the removal of the insoluble matter is obtained if the agent is added to the suspension which remains after a substantial part of the insoluble matter has been removed, for example by filtration or settling. The suspension may be neutral or mildly acid or mildly alkaline; for the process of the invention mildly alkaline conditions corresponding to a pH value up to about 10.0 are preferred.

The agent may be added as a salt such as for example a sodium salt or as the free acid; the free acid forms a salt in situ. It is preferred to add it in aqueous solution.

As examples of carboxylic acids whose salts may be used for the process of the invention there may be mentioned saturated carboxylic acids such as for example nonanoic acid, lauric acid, myristic acid, palmitic acid and stearic acid, unsaturated carboxylic acids such as for example oleic acid, and substituted carboxylic acids such as for example ricinoleic acid and ricinoleic acid condensed with a few molecules of ethylene oxide. Commercially available forms of these acids may also be used such as the mixture known as "brown oleine" which is crude oleic acid and such as castor oil fatty acids which comprise ricinoleic acid. In the class of carboxylic acids oleic acid, ricinoleic acid and ricinoleic acid condensed with a few molecules of ethylene oxide are especially effective.

As examples of sulphonic acids whose salts may be used there may be mentioned alkylarylsulphonic acids such as for example octyl benzene sulphonic acid and homologues and mixtures thereof and acyl taurines such as for example N-methyl-N-oleoyl taurine, N-n-butyl-N-oleoyl taurine and N-isobutyl-N-oleoyl taurine. In general it is found that especially good results are obtained when the aliphatic hydrocarbon chain is of at least 11 carbon atoms. On grounds of low cost and high effectiveness it is preferred to use the sodium salt of dodecyl benzene sulphonic acid, especially commercially available forms of this substance such as for example the products sold under the registered trademarks "Nervan" and "Nansa." The aliphatic hydrocarbon chain in commercially available forms of this substance is usually present in more than one isomeric form. In some products other chains, e.g. $C_{11}$ and $C_{13}$ are also present. Carboxylic and sulphonic acids and their water soluble salts are often marketed with a content of various salts, such as sodium chloride, sodium carbonate and sodium sulphate. It has been found that moderate concentrations of impurities of this type do not interfere with the process of the invention.

The action of the agent takes place at temperatures up to the boiling point of the solution at the operating pressure and is highly satisfactory at temperatures in the range 50° C. to 90° C. at which this stage of this process for producing ammonium sulphate is usually carried out. The action takes from a few minutes up to a few hours, for instance up to five hours.

The quantity of the agent required depends on the detailed conditions of working and may be determined in a simple manner by laboratory experiments which in general have been found to be a valuable guide to the quantities needed on the plant scale. For concentrations of insoluble matter commonly encountered, a quantity up to 250 parts per million by weight of the reaction mixture has been found to be effective and often 2 to 25 parts per million are sufficient.

By the use of the agent the insoluble matter settles out rapidly and is found to be efficiently retained by many filters which when the process is operated according to the prior art were incapable of retaining it.

The invention is illustrated but not limited by the following examples in which the parts are by weight.

EXAMPLE 1

A solution of ammonium sulphate at pH 8.5 being a sample of the liquor obtained by the plant-scale reaction of calcium sulphate with ammonia and carbon dioxide followed by a single filtration was divided into four equal portions. To these samples were added respectively 0, 10, 20 and 30 p.p.m. of "Nervan E L" which is a commercial product containing 40% by weight of sodium dodecyl benzene sulphonate. At 20° C. the mixture was stirred for 30 minutes, then allowed to stand for ten minutes. The percentages of suspended solids which settled out were as shown in Table 1.

Table 1
EFFECT OF SODIUM DODECYLBENZENESULPHONATE (NERVAN E L) ON THE SETTLING OF CALCIUM CARBONATE ETC. FROM ONCE-FILTERED AMMONIUM SULPHATE SOLUTION

| Concentration of Nervan E L in parts per million: | Percent of solids settled |
|---|---|
| 0 | 80 |
| 10 | 96 |
| 20 | 98.3 |
| 30 | 98.5 |

EXAMPLE 2

7 equal portions of a solution of ammonium sulphate at pH 8.5 similar to that used in Example 1 were treated as follows:

One of these was kept at 20° C. as a control. To the remaining 6 portions were added respectively N-n-butyl-N-oleoyl taurine (three concentrations) and N-isobutyl-N-oleoyl taurine (three concentrations). The solutions were stirred for 30 minutes, then allowed to settle for 15 minutes at the same temperature as the control. The percentages of the suspended solids which settled out were as shown in Table 2.

Table 2
EFFECT OF N-BUTYL-N-OLEOYL TAURINES ON THE SETTLING OF CALCIUM CARBONATE ETC. FROM ONCE-FILTERED AMMONIUM SULPHATE SOLUTION

| Agent used | Percent of solids settled | | |
|---|---|---|---|
| | 5 p.p.m. | 10 p.p.m. | 25 p.p.m. |
| N-butyl-N-oleoyl taurine | 96.3 | 99.4 | 97.6 |
| N-isobutyl-N-oleoyl taurine | 94.0 | 96.8 | 97.1 |
| None | | 53.4 | |

EXAMPLE 3

Using 11 equal portions of once-filtered ammonium sulphate solution similar to that used in Example 1 the procedure of Example 2 was repeated with a single concentration (25 p.p.m.) of a carboxylic acid or its salt. The percentages of suspended solids which settled out were shown as in Table 3.

Table 3
EFFECT OF SALTS OF CARBOXYLIC ACIDS ON THE SETTLING OF CALCIUM CARBONATE ETC. FROM ONCE-FILTERED AMMONIUM SULPHATE SOLUTION

| Added agent: | Percent of solids settled |
|---|---|
| Sodium nonanoate | 78.3 |
| Sodium decanoate | 65.3 |
| Sodium laurate | 86.2 |
| Sodium myristate | 70.2 |
| Sodium palmitate | 69 |
| Sodium stearate | 67.5 |
| Oleic acid | 98.2 |
| Brown oleine | 99.0 |
| Castor oil fatty acids-ethylene oxide | 95.3 |
| Ricinoleic acid | 97.6 |
| None | 53.4 |

EXAMPLE 4

Eight equal portions of a solution of ammonium sulphate similar to that used in Example 1 were treated in pairs with the appropriate volume of dilute sulphuric acid or dilute ammonium hydroxide to adjust the pH to the four values shown in Table 4. To one sample from each pair there was then added 12.5 parts per million of Nansa H S which is a commercial product containing 80% by weight of sodium dodecylbenzenesulphonate and to the other sample from each pair there was added 25 parts per million of oleic acid. The solutions were allowed to stand for 15 minutes. The percentages of the suspended solids which had settled out were as shown in Table 4.

Table 4
EFFECT OF pH ON THE ACTION OF SODIUM DODECYLBENZENESULPHONATE AND OLEIC ACID IN THE SETTLING OF CALCIUM CARBONATE ETC. FROM ONCE-FILTERED AMMONIUM SULPHATE SOLUTION

| Agent used | pH | Percent of solids settled |
|---|---|---|
| Nansa H S | 7.4 | 98.6. |
| Do | 8.2 | 98.8. |
| Do | 9.3 | 99.0. |
| Do | 10.0 | 94.3. |
| Oleic acid | 7.4 | not available. |
| Do | 8.2 | 99.8. |
| Do | 9.3 | 99.9. |
| Do | 10.0 | 92.4. |

It is evident that these agents are less effective at pH 10.0 than at lower pH values, but are nevertheless still of interest at pH 10.0.

EXAMPLE 5

The finished reaction magma from the last of a series of vessels in which ammonia, carbon dioxide and calcium sulphate were reacted together in water to give ammonium sulphate and calcium carbonate was passed to a flannel-clothed rotary vacuum primary filter in which it was freed of most of its suspended calcium carbonate and other insoluble matter. The filtrate liquor, containing about 500 grams per litre of ammonium sulphate, was passed to an intermediate vessel in which there was added to it sodium dodecylbenzenesulphonate (in the form of an aqueous solution of the product Nervan E L) at the rate of 4.8 parts per million of the liquor. The residence time in this vessel was three hours. The liquor was then passed through a cylindrical secondary filter and thence to a set of evaporators where it was concentrated for crystallisation. The filtrate liquor from the secondary filter was found to contain a very small proportion of suspended calcium carbonate: in liquor from the same secondary filter, but operating the process without the addition of sodium dodecylbenzenesulphonate the calcium carbonate content was observed to be about three times as great. It was also observed that when operating the process with the addition of sodium dodecylbenzenesulphonate the secondary filter was more easily washed and the evaporators showed less tendency to become blocked by accumulated deposits than when the addition was not made.

We claim:

1. In a process for the manufacture of ammonium sulphate by reacting together ammonia, carbon dioxide and calcium sulphate, the step of facilitating the separation of insolubles by incorporating in the reaction mixture under mildly alkaline conditions corresponding to a pH value up to about 10.0 at a stage when insoluble by-products are present, an agent comprising a water-soluble salt of at least one acid selected from the group consisting of carboxylic acids and sulphonic acids, the said carboxylic acids and sulphonic acids containing an aliphatic hydrocarbon chain of at least 8 carbon atoms.

2. A process as claimed in claim 1 wherein the agent is added to the suspension which remains after a substantial part of the insoluble matter has been removed.

3. A process as claimed in claim 1 wherein the reaction mixture in which the agent is present is at a temperature in the range of 50° C. to 90° C.

4. A process as claimed in claim 1 wherein the agent comprises a salt of oleic acid.

5. A process as claimed in claim 1 wherein the agent comprises a salt of ricinoleic acid.

6. A process as claimed in claim 1 wherein the agent comprises ricinoleic acid condensed with a few molecules of ethylene oxide.

7. A process as claimed in claim 1 wherein the agent comprises a salt of an acyl taurine.

8. A process as claimed in claim 1 wherein the agent comprises a salt of alkylarylsulphonic acid.

9. A process as claimed in claim 8 wherein the agent comprises the sodium salt of dodecylbenzene sulphonic acid.

10. A process as claimed in claim 8 wherein the agent is a commercially available form of the sodium salt of dodecylbenzene sulphonic acid.

References Cited in the file of this patent

UNITED STATES PATENTS

| | | |
|---|---|---|
| 2,226,101 | Ogden | Dec. 23, 1940 |
| 2,656,247 | Robinson | Oct. 20, 1953 |
| 2,903,431 | Ruff et al. | Sept. 8, 1959 |